United States Patent [19]

Sloan, Jr.

[11] Patent Number: 5,432,292
[45] Date of Patent: Jul. 11, 1995

[54] METHOD FOR CONTROLLING CLATHRATE HYDRATES IN FLUID SYSTEMS

[75] Inventor: Earle D. Sloan, Jr., Golden, Colo.

[73] Assignee: Colorado School of Mines, Golden, Colo.

[21] Appl. No.: 83,108

[22] Filed: Jun. 24, 1993

Related U.S. Application Data

[63] Continuation-in-part of Ser. No. 979,588, Nov. 20, 1992.

[51] Int. Cl.⁶ .......................... C07C 7/20; F17D 1/05
[52] U.S. Cl. ..................... 585/15; 585/950; 137/3; 137/13; 166/310; 166/371
[58] Field of Search ...... 585/15, 950; 137/3, 137/13; 166/310, 371; 252/8.551

[56] References Cited

U.S. PATENT DOCUMENTS

| | | | |
|---|---|---|---|
| 2,115,823 | 5/1938 | Miller et al. | 87/9 |
| 3,096,383 | 7/1963 | Hann | 260/676 |
| 3,213,593 | 10/1965 | Hendrix | 55/32 |
| 3,348,614 | 10/1967 | Sinclair et al. | 166/45 |
| 3,644,107 | 2/1972 | Clark | 48/190 |
| 3,857,686 | 12/1974 | Arnold et al. | 585/15 |
| 3,962,110 | 6/1976 | Tate | 252/181 |
| 4,132,535 | 1/1979 | Rivers, Jr. et al. | 55/23 |
| 4,456,067 | 6/1984 | Pinner, Jr. | 166/279 |
| 4,556,499 | 12/1985 | Heier et al. | 252/51.5 |
| 4,597,779 | 7/1986 | Diaz | 55/32 |
| 4,792,412 | 12/1988 | Heilweil | 252/8.514 |
| 4,856,593 | 8/1989 | Matthews et al. | 106/310 |
| 4,915,176 | 4/1990 | Sugier et al. | 166/371 |
| 4,973,775 | 11/1990 | Sugier et al. | 585/15 |
| 5,055,178 | 10/1991 | Sugier et al. | 208/188 |
| 5,076,364 | 12/1991 | Hale et al. | 166/310 |
| 5,127,231 | 7/1992 | Larue et al. | 62/20 |
| 5,244,878 | 9/1993 | Sugier et al. | 585/15 |

FOREIGN PATENT DOCUMENTS

| | | |
|---|---|---|
| 318784 | 11/1974 | Austria . |
| 612901 | 1/1961 | Canada . |
| 1168427 | 6/1984 | Canada . |
| 0457375A1 | 11/1991 | European Pat. Off. . |
| 0526929A1 | 2/1993 | European Pat. Off. . |
| 2618876 | 2/1989 | France . |
| 1282946 | 7/1972 | United Kingdom . |
| 1339235A1 | 9/1987 | U.S.S.R. . |

*Primary Examiner*—Asok Pal
*Assistant Examiner*—Walter D. Griffin
*Attorney, Agent, or Firm*—Sheridan Ross & McIntosh

[57] ABSTRACT

Discussed is a process for preventing clathrate hydrate masses from impeding the flow of fluid in a fluid system. An additive is contacted with clathrate hydrate masses in the system to prevent those clathrate hydrate masses from impeding fluid flow. The process is particularly useful in the natural gas and petroleum production, transportation and processing industry where gas hydrate formation can cause serious problems. Additives preferably contain one or more five member, six member and/or seven member cyclic chemical groupings. Additives include poly(N-vinyl-2-pyrrolidone) and hydroxyethylcellulose, either in combination or alone. Additives can also contain multiple cyclic chemical groupings having different size rings. One such additive is sold under the name Gaffix VC-713.

62 Claims, No Drawings

METHOD FOR CONTROLLING CLATHRATE HYDRATES IN FLUID SYSTEMS

ACKNOWLEDGEMENT OF GOVERNMENT SUPPORT

This invention was made with Government support under Grant No. DE-FG21-92MC29248 awarded by the Department of Energy. The Government has certain rights in the invention.

CROSS-REFERENCE TO RELATED APPLICATIONS

This application is a continuation-in-part of U.S. patent application No. 07/979,588 by Sloan, Jr., filed Nov. 20, 1992.

FIELD OF THE INVENTION

The present invention involves a method for controlling problems that can be caused by clathrate hydrates, and particularly by gas hydrates, in fluid systems.

BACKGROUND OF THE INVENTION

Clathrate hydrates are crystalline compounds which occur when water forms a cage-like structure around guest molecules. Clathrate hydrates, especially in the hydrocarbon industry, are often referred to as gas hydrates, or simply as hydrates. Gas hydrates of interest to the hydrocarbon industry, particularly with respect to producing, transporting, and processing of natural gas and petroleum fluids, are composed of water and the following eight guest molecules: methane, ethane, propane, isobutane, normal butane, nitrogen, carbon dioxide, and hydrogen sulfide. Other guest molecules capable of forming clathrate hydrates, although not normally of significant interest to the hydrocarbon industry, include nitrous oxide, acetylene, vinyl chloride, methyl bromide, ethyl bromide, cyclopropane, methyl mercaptan, sulfur dioxide, argon, krypton, oxygen, xenon, trimethylene oxide, and others. Clathrate hydrate formation is a possibility any place water exists in the vicinity of such molecules, both naturally and artificially, at temperatures above 32° F. and below 32° F. when the pressure is elevated.

It is primarily due to their crystalline, insoluble, non-flowing nature that hydrates have been of interest to industry. They have been considered a nuisance, because they block transmission lines, plug Blow Out Preventors, jeopardize the foundations of deepwater platforms and pipelines, collapse tubing and casing, and foul process heat exchangers and expanders. Common examples of preventive measures are found in the regulation of pipeline water content, unusual drilling mud compositions, and large quantities of methanol injection into pipelines.

Hydrates normally form in one of two small, repeating crystal structures. Structure I (sI), a body-centered cubic structure, forms with natural gases containing molecules smaller than propane. Structure II (sII), a diamond lattice within a cubic framework, forms when natural gases or oils contain molecules larger than ethane but smaller than pentane; this structure represents hydrates which commonly occur in hydrocarbon production and processing conditions. Also, at least one other repeating crystal structure is known to exist, and additional structures theoretically could exist.

The structures of both sI and sII are given with reference to a water molecule skeleton, in which guest molecules are encaged, composed of a basic "building block" cavity which has twelve pentagonal faces given the abbreviation $5^{12}$. By linking the vertices of $5^{12}$ cavities one obtains sI, while linking the faces of $5^{12}$ cavities results in sII. The regions between the linked $5^{12}$ cavities in repeating crystal structures are larger cavities which contain twelve pentagonal faces and either two or four hexagonal faces: $5^{12}6^2$ for sI and $5^{12}6^4$ for sII. The water molecules of a cavity are held in place by hydrogen bonds, which attach water molecules to each other to form the cavity. Inside each cavity resides a maximum of one guest molecule Cavities other than the $5^{12}, 5^{12}6^2$, and $5^{12}6^4$ cavities, just described, could exist in repeating crystal structures other than sI and sII. Any cavity, however, should have exactly twelve pentagonal faces. Additional information concerning clathrate hydrates, and particularly gas hydrates, can be found in Sloan, *Clathrate Hydrates of Natural Gases*, M. Dekker, N.Y., 1990, the contents of which are incorporated herein in their entirety.

There are four common means of inhibiting formation of or dissociating hydrates, namely: 1) removing one of the components, either the guest molecule or water, 2) heating the system beyond the hydrate formation temperature at a given pressure, 3) decreasing the system pressure below hydrate stability at a given temperature, and 4) injecting an inhibitor such as methanol or glycol to decrease hydrate stability conditions so that higher pressures and lower temperatures are required for hydrate stability. The above four common techniques are termed thermodynamic inhibition, because they remove the system from thermodynamic stability, by changes in composition, temperature, or pressure. While the system is kept outside thermodynamic stability conditions, hydrates can never form.

In European Patent Office Publication No. 0457375A1, published Nov. 21, 1991, use of alkyl aryl sulphonic acids is proposed for preventing or retarding the formation of hydrates or for reducing the tendency of hydrates to agglomerate.

In U.S. Pat. No. 4,915,176 by Sugier et al., issued Apr. 10, 1990, a method is proposed for transporting a fluid under conditions at which hydrates are allowed to form. That patent discusses the use of amphophilic compounds, having a hydrophilic part and an lipophilic part, which are mixed with a fluid to be transported to lower the gas hydrate formation temperature and/or to modify the mechanism of formation of such hydrates. It is reported that such compounds disperse the gas hydrates in the fluid and then prevent their agglomeration. However it is believed that the chemicals used in this process are expensive and could require extensive recycling to be economical. The process would not be effective in a fluid system containing a continuous aqueous liquid phase, that is, for example, an aqueous liquid phase that is not dispersed throughout a continuous organic liquid phase such as in a water-in-oil type emulsion. Therefore, that process would not be effective, for example, in a fluid system containing both a gaseous and an aqueous liquid phase, but containing no organic liquid phase, or a fluid system comprising significantly more aqueous liquid phase than organic liquid phase.

From the foregoing, it appears that there is a need for new methods to address clathrate hydrate problems in fluid systems, particularly those encountered in producing, transporting, and processing petroleum and natural gas fluids.

SUMMARY OF THE INVENTION

One object of the present invention is to provide a process for preventing clathrate hydrate masses in a fluid stream from impeding flow of the fluid stream, particularly with respect to fluid streams encountered in the hydrocarbon industry such as with the production, transportation and processing of petroleum and natural gas fluids.

Another object is to provide an economical process for preventing clathrate hydrate problems in fluid systems.

Another object is to provide additives for use in controlling clathrate hydrates in fluid systems, which additives have low toxicity and, therefore, their use is environmentally desirable.

Another object of the invention is to provide a process for preventing clathrate hydrate masses from agglomerating to form large masses in fluid systems containing a continuous aqueous liquid phase.

According to the present invention, an additive is added to a fluid system to prevent clathrate hydrate masses from forming, or to prevent clathrate hydrates that are present, or that form, in a fluid system from agglomerating or otherwise growing to form clathrate hydrate masses that would be large enough to create problems in the fluid system, such as by impeding the flow of fluids. Preferably, clathrate hydrate masses are prevented from becoming larger than the size of several repeating crystal structure units. More preferably, clathrate hydrate masses in a fluid system are prevented from forming masses larger than a repeating crystal structure, and most preferably from forming masses as large as a repeating crystal structure. In particular, it is believed that the additive interacts with clathrate hydrate cavities of clathrate hydrate masses in a way that prevents those cavities from participating in the formation of larger clathrate hydrate masses.

In one embodiment, clathrate hydrate masses are prevented from impeding the flow of a fluid stream by the addition of an additive comprising poly(N-vinyl-2-pyrrolidone) to the fluid system. In another embodiment the additive comprises hydroxyethylcellulose. In another embodiment the additive comprises a compound sold under the name "Gaffix VC-713" by International Specialty Products, or comprises a compound having similar attributes.

In another embodiment, an additive comprising at least one five member cyclic chemical grouping, or six member cyclic chemical grouping and/or seven member chemical grouping is applied to the fluid stream to prevent clathrate masses from impeding the flow and, more specifically, it is believed, to interfere with the process by which smaller clathrate hydrate masses form larger clathrate hydrate masses. In one embodiment, the cyclic chemical grouping is nonaromatic. In another embodiment, the cyclic chemical grouping comprises a heterocyclic ring, preferably including an internal amide and/or an internal ester group.

In one embodiment, the additive comprises multiple different cyclic chemical groupings, preferably with a first cyclic chemical grouping having a different number of atoms in the ring than a second cyclic chemical grouping. In another embodiment, an additive comprises both a five member cyclic chemical grouping and a seven member cyclic chemical grouping.

In another embodiment, clathrate hydrate masses are prevented from impeding the flow of a fluid stream by application of an additive that has a molecular weight greater than about 3,000. Preferably, the additive is a polymer of molecular weight greater than about 40,000.

According to the present invention, The fluid system may comprise, in addition to clathrate hydrate masses that may be present, any combination and relative proportions of a gaseous phase, an aqueous liquid phase, and an organic liquid phase. In one embodiment, the fluid system comprises an aqueous liquid phase and a gaseous phase. In another embodiment, the fluid system comprises a fluid stream that is transported by flow through a conduit. In another embodiment, the fluid system comprises one or more fluid phases from the production, transportation or processing of natural gas or petroleum fluids.

DETAILED DESCRIPTION OF THE INVENTION

In one respect, the present invention involves preventing clathrate hydrate formation or controlling the joining together of clathrate hydrate masses in fluid systems to form larger clathrate hydrate masses. The present invention also involves controlling the formation of clathrate hydrates in a fluid system to prevent large clathrate hydrate agglomerates in a fluid system. A fluid stream having clathrate hydrate masses mixed therein, or that is susceptible to the formation of clathrate hydrate masses, is contacted with an additive that prevents clathrate hydrate masses from forming a mass or masses that could impede the flow of the fluid stream. Preferably, clathrate hydrate masses no larger than several repeating crystal structure units are allowed to form. More preferably, clathrate hydrate masses no larger than a repeating crystal structure are allowed to form. Most preferably, no clathrate hydrate masses become as large as a repeating crystal structure. Preferably, the additive is soluble in water.

The present invention is particularly useful in the hydrocarbon industry such as with the production, transportation and processing of natural gas and petroleum. The present invention is useful, for example, to control gas hydrates that could form during extraction of natural gas and petroleum fluids through a producing well, during transportation of the extracted fluids, and during processing of the extracted fluids.

Preferably, the additive comprises at least one cyclic chemical grouping, also known as a ring grouping, in its molecular structure, and more preferably, the additive comprises a plurality of cyclic chemical groupings, which can be either the same or different from one another. More preferably the cyclic chemical grouping is not aromatic. A cyclic chemical grouping refers to an organic ring structure, which may contain only carbon atoms as members of the ring, or may contain one or more other atoms in a heterocyclic ring such as, for example, atoms of oxygen, nitrogen, sulfur, and phosphorus atoms. Preferably, the cyclic grouping has a polar moiety, which is either a polar atom, such as oxygen or nitrogen, in the ring, or a polar substituent, such as an oxygen atom, attached to the ring, or both. More preferably, the cyclic chemical grouping is heterocyclic and most preferably comprises an oxygen or nitrogen atom in the ring. Preferably, the additive comprises an ester and/or an amide linkage internal to the ring of a cyclic chemical grouping.

It is particularly preferred that the additive comprise at least one five member cyclic chemical grouping, one six member cyclic chemical grouping and/or one seven member cyclic chemical grouping in its molecular structure. Most preferably, the additive comprises at least one five member cyclic chemical grouping in its molecular structure.

Although not wishing to be bound by theory, it is believed that when guest molecules, such as those in natural gases, dissolve in water and form clathrate hydrates, that water molecules cluster around the guest molecule, in a labile, non-permanent structure which closely resembles the $5^{12}$ cavity. Two or more of these water clusters have been shown to share either vertices or faces, in the beginning of hydrate crystallization.

It is therefore possible to prevent clathrate hydrates from plugging, or otherwise impeding the flow of fluids by using a kinetic growth inhibitor to block small fluid-like species from becoming larger crystalline species.

One method of inhibition according to the process of the present invention, called kinetic inhibition, allows the system to exist in the hydrate thermodynamic stability region, but small hydrates nuclei are hindered form agglomerating to larger masses by means of small quantities of new chemicals. It is believed that five member cyclic chemical structures are particularly useful because they interact with one more of the pentagonal faces of a cavity, thereby preventing those pentagonal faces from participating in the formation of a larger clathrate hydrate mass.

Preferably, the additive is a polymer of molecular weight greater than about 3,000, more preferably of molecular weight greater than about 20,000, and most preferably of molecular weight greater than about 40,000. As used herein, polymer refers to homopolymers and copolymers. As used herein, copolymer refers to a polymer made from any number of different monomers in excess of one.

One preferred class of additives are those comprising one or more five, six and/or seven member cyclic chemical groupings wherein at least one cyclic chemical grouping comprising an internal ester or an internal amide. Examples of cyclic groupings comprising internal amides include, for example, lactams and substituted lactams. Examples of cyclic groupings comprising internal esters include lactones and substituted lactones. Additives comprising cyclic chemical groupings representative of, or derived from, lactams or substituted lactams are particularly preferred.

In one embodiment, the additive comprises a poly(N-vinyl lactam) homopolymer or copolymer. As used herein, poly(N-vinyl lactam) refers to polymers prepared using one or more monomers having a vinyl group substituted onto the nitrogen of a lactam ring. One such substance that has been found to be particularly effective, and is therefore particularly preferred as an additive, is poly(N-vinyl-2-pyrrolidone), which comprises a plurality of five member cyclic groupings extending from a polymer backbone. The five member cyclic groupings comprise an internal amide characteristic of a lactam. Preferably, such poly(N-vinyl-2-pyrrolidone) is of molecular weight greater than about 3,000, more preferably greater than about 20,000, and most preferably greater than about 40,000. Poly(N-vinyl-2-pyrrolidone) is a chemical with low toxicity. Therefore, it would not cause significant environmental damage if accidentally released into the environment, such as might occur in case of a pipeline leak.

Poly(N-vinyl-2-pyrrolidone) is a polymer having a backbone with the following five member cyclic grouping, referred to herein as Grouping I, such as may be derived from 2-pyrrolidone which is also called butyrolactam:

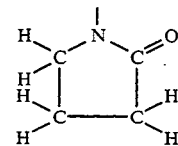

Other compounds having Grouping I could also be used as additives. Preferably, the additives are polymers having a molecular weight greater than about 40,000. Grouping I could be incorporated into a polymer, for example, by addition polymerization of N-vinyl-2-pyrrolidone, either alone or with other polymers to form a copolymer.

In one embodiment, the additive has a seven member cyclic grouping. One preferred seven member cyclic grouping is the following grouping, referred to herein as Grouping II, such as may be derived from ε-caprolactam:

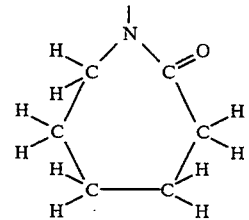

The additive is preferably a polymer, more preferably having a molecular weight greater than about 40,000. Such a caprolactam radical could, for example, extend from a polymer backbone, such as a polyvinyl backbone. Grouping II could be incorporated into a polymer, for example, by addition polymerization of N-vinyl-ε-caprolactam, either alone or with other monomers to form a copolymer.

In one embodiment, the additive comprises a plurality of different cyclic chemical groupings. Preferably, the additive comprises at least two cyclic chemical groupings and more preferably, the additive comprises first cyclic chemical grouping having a different number of atoms in its ring than a second cyclic chemical grouping. Even more preferably, the additive comprises a five member cyclic chemical grouping and a seven member cyclic chemical grouping. Preferably at least one of the cyclic chemical groupings comprises an internal amide and/or an internal ester and more preferably at least two different cyclic chemical groupings comprise an internal amide and/or an internal ester. Preferably, the additive is a polymer with a molecular weight greater than about 40,000, which preferably is also soluble in water. In one preferred embodiment, the multiple cyclic chemical groupings are such that they do not form a part of the polymer backbone, but rather extend from the polymer backbone, such as would be the case for substituents grafted onto a polymer backbone. More preferably, in addition to the multiple cyclic chemical groupings which are not a part of the polymer backbone, at least one noncyclic chemical grouping also extends from the polymer backbone. Such a noncyclic chemical group can comprise either a normal or a branched chain structure. Preferably, the noncyclic chemical grouping comprises at least one polar atom such as oxygen, nitrogen, sulfur or phosphorus, more preferably nitrogen and/or oxygen. Most preferably, such a noncyclic chemical grouping comprises an amino or substituted amino group.

In one embodiment, the additive comprises a five member cyclic chemical grouping, a seven member cyclic chemical grouping, and a noncyclic chemical grouping. Preferably, all three of these chemical groupings form or are part of substituents extending from a polymer backbone. One chemical that has been found to be particularly useful comprises Grouping I, Grouping II and the following noncyclic grouping, referred to herein as Grouping III:

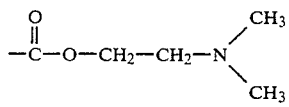

The polymer can be any polymer with these three chemical groupings, and may be, for example, block, random, or graft copolymers. Grouping III could be incorporated into a polymer, for example, by addition polymerization of dimethyl ethyl amino methacrylate with other appropriate monomers to form a copolymer having all of Groupings I, II and III. Preferably, the polymer has a molecular weight greater than about 40,000. Alternatively, an additive may have Grouping III and only one of Grouping I and Grouping II.

One specific example of a compound having all of Groupings I, II and III is that sold under the name "Gaffix VC-713" by International Specialty Products which currently has a business address of 1361 Alps Road, Wagner, N.J. Gaffix VC-713 is a copolymer prepared from three monomers, which is often referred to as a terpolymer. Those three monomers are N-vinyl-2-pyrrolidone, N-vinyl-ε-caprolactam and dimethyl ethyl amino methacrylate.

Another preferred addition is hydroxyethylcellulose, which comprises six membered cyclic chemical groupings. In one particularly preferred embodiment, the additive comprises both poly(N-vinyl-2-pyrrolidone) and hydroxyethylcellulose.

The fluid system comprises any fluid or fluids comprising water and guest molecules, which water and guest molecules together can form clathrate hydrates. The fluid system may comprise any combination of one or more gaseous phase, aqueous liquid phase, and organic liquid phase, and in any proportions. Typically, the fluid system will comprise at least two fluid phases, a gaseous phase, which comprises guest molecules, and an aqueous liquid phase. Typically, a suitable fluid system comprising an organic liquid phase also comprises both a gaseous phase and an aqueous liquid phase.

The present invention is particularly useful in fluid systems comprising a continuous aqueous liquid phase. A continuous aqueous liquid phase is, for example, an aqueous phase that is not dispersed as small, emulsified droplets throughout a continuous organic phase, as would be the case in a water-in-oil type emulsion. Therefore, the present invention is particularly useful, for example, when the fluid system comprises a gaseous phase and an aqueous liquid phase in the absence of an organic liquid phase, or at least in the absence of an organic liquid phase of significant volumetric proportion relative to the aqueous liquid phase. It has been surprisingly discovered that, according to the present invention, clathrate hydrate masses in such a fluid system, containing a continuous aqueous liquid phase will nonetheless disperse in the fluid system, and in particular will disperse in the continuous aqueous liquid phase, and will not agglomerate to form a mass large enough to impede the flow of a fluid stream comprising the dispersed clathrate hydrate masses. This is particularly surprising because, in the absence of a substantial organic liquid phase, the aqueous liquid phase cannot be emulsified and dispersed throughout the organic phase to maintain dispersion of clathrate hydrates forming in small, dispersed aqueous droplets.

With the present invention, it is not necessary to disperse an aqueous liquid phase, such as throughout an organic liquid phase, to prevent agglomeration of clathrate hydrate masses. With the present invention, even in a fluid system that contains a shortage of available water relative to available guest molecules for the formation of clathrate hydrates, not all of the water will participate with guest molecules to form clathrate hydrates. Rather, free water will typically remain in an aqueous liquid phase, which will have clathrate hydrate masses dispersed therein.

Based on the foregoing, it will be recognized that the present invention has wide applicability to fluid systems of varying relative proportions of gaseous, aqueous liquid, and organic liquid phases. The present invention, for example, will disperse clathrate hydrates in an aqueous phase, whether such aqueous phase is in a gas/aqueous liquid system or in a gas/aqueous liquid/organic liquid system. Also, in a gas/aqueous liquid/organic liquid system, it is not necessary that the organic liquid phase predominates over the aqueous liquid phase because it is not necessary to disperse the aqueous phase as small droplets in an emulsified form.

Contacting an additive with clathrate hydrates in a fluid system, according to the present invention, can be accomplished using any suitable contacting means. For example, such contacting can be effected by mixing an additive into the fluid system, such as into a flowing fluid stream. For example, an additive could be injected into a downhole location in a producing well to control clathrate hydrates in fluids being produced through that well. Likewise, an additive could, for example, be injected into the produced fluid stream at a wellhead location, or even into piping extending through a riser, through which produced fluids are transported in offshore producing operations from the ocean floor to the offshore producing facility located at or above the surface of the water. Also, an additive could be injected into a fluid stream prior to transporting that fluid stream, such as by injecting an additive into the fluid stream which is then transported, such as via subsea pipeline from an offshore producing location to an onshore processing facility.

Additives useful according to the present invention, can be normally solid, normally liquid, or normally gaseous. If such additive is normally solid, such as is the case with many polymers, including poly(N-vinyl-2-pyrrolidone), such solid additive is preferably dissolved into a carrier liquid, so that the additive can then be injected into the fluid system in liquid form. For example, poly(N-vinyl-2-pyrrolidone), Gaffix VC-713, and/or hydroxyethylcellulose, can be dissolved in methanol, and the methanol solution can then be injected directly into a flowing fluid stream to affect a desired contacting of the additive with clathrate hydrate masses that may form in the fluid stream during transportation, such as through a pipeline. The carrier liquid should preferably be soluble in water. Water, however, is generally not preferred as a carrier liquid because of the tendency of such water to promote additional clathrate hydrate formation in the fluid system.

Preferably, an additive is mixed with the fluid system prior to the formation of clathrate hydrates in that fluid system. The additive would then be present in the fluid system to contact clathrate hydrate masses as they first form.

Mixing of an additive into the fluid system, or contacting of an additive already in the fluid system with clathrate hydrate masses, may be aided by mechanical means, as are well known in the art, such as, for example, by using conveniently located static, in-line mixers on a pipeline. In most pipeline transportation applications, however, sufficient mixing and contacting will occur due to the turbulent nature of the fluid flow and mechanical mixing aids will not be required.

It will be recognized that the amount of additive required to be added to any particular fluid system will depend upon the composition of that system and the conditions of temperature and pressure to which the fluid system will be subjected. Generally, however, such additive will be added in an amount that results in from about 0.2% to about 0.5%, by weight, of additive relative to free water in a fluid system.

The following examples are provided for the purpose of illustrating the present invention and are not intended to limit the scope of the invention in any way.

EXAMPLE 1

This example is provided for comparison, and illustrates the formation of clathrate hydrates in an aqueous solution and growth of those clathrate hydrates into masses of sufficient size to form a clathrate hydrate plug in a fluid system.

A 15 ml test tube is filled with an aqueous solution containing 3.5 weight percent sodium chloride, relative to water, and 20 weight percent of tetrahydrofuran, also relative to water. Tetrahydrofuran is a compound capable of forming a clathrate hydrate. A stainless steel ball having an outside diameter of 0.20 inch is inserted into the test tube so that the ball can roll freely along the tube length. The test tube is sealed and placed in a water bath containing ice that is at a temperature of 0° C. A mechanical device rotates the test tube continuously end-over-end about the center point of the length of the test tube. The stainless steel ball rolls from one end of the test tube to the other during each rotation of the test tube. The test tube is visually observed while rotating in such a fashion.

The solution becomes cloudy, indicating the initiation of a clathrate hydrate phase within the tube, after about twelve minutes of rotating in the water bath. After approximately thirty minutes of rotating in the water bath, the ball completely stops rolling in the test tube, indicating that clathrate hydrates have formed a plug within the test tube.

EXAMPLE 2

This example illustrates the use of an additive to prevent aggregation of clathrate hydrates in an aqueous solution to form a clathrate hydrate plug.

The experimental procedure of Example 1 is repeated, except that poly(N-vinyl-2-pyrrolidone) is added to the aqueous solution in an amount of 0.5 percent by weight, relative to water. The solution in the test tube becomes cloudy after approximately 45 minutes of rotating in the water bath. After 6 hours of rotating in the water bath, the ball is still rolling. Normally, even if this experiment is continued after 6 hours, the ball continues to roll in the test tube even after a period of 24 hours. Therefore, the additive prevents the formation of a clathrate hydrate plug in the test tube over what is believed to be a commercially significant period of time.

EXAMPLE 3

This example illustrates the use of Gaffix VC-713, as previously described, to control the formation and/or agglomeration of clathrate hydrates.

The experimental procedure of Example 1 is repeated, except that Gaffix VC-713 is added to the aqueous solution in an amount of 0.5 percent by weight, relative to water. After eight hours of rotating in the water bath, the solution in the test tube shows no signs of hydrate formation.

While various embodiments of the present invention have been described in detail, it is apparent that modifications and adaptations of those embodiments will occur to those skilled in the art. It is to be expressly understood, however, that such modifications and adaptations are within the scope of the present invention, as set forth in the following claims.

What is claimed is:

1. A method for controlling clathrate hydrates, said method comprising the steps of:
   (a) providing a flowable fluid, said flowable fluid comprising water and guest molecules, said guest molecules in combination with water being capable of forming clathrate hydrates;
   (b) providing an additive, said additive comprising a poly(N-vinyl lactam) polymer having a molecular weight greater than about 40,000, said polymer comprising a backbone, said polymer comprising a first cyclic chemical grouping extending from said backbone and a second cyclic chemical grouping extending from said backbone, said first cyclic chemical grouping comprising a nonaromatic five member organic heterocyclic ring having an internal amide, said second cyclic chemical grouping comprising a nonaromatic seven member organic heterocyclic ring having an internal amide, said polymer comprising a noncyclic chemical grouping extending from said backbone; and
   (c) contacting said additive and said flowable fluid under conditions of temperature and pressure at which clathrate hydrates are chemically stable, said additive capable of preventing clathrate hydrate masses from impeding flow of said flowable fluid.

2. A method for controlling clathrate hydrates in a fluid, the method comprising the steps of:
   (a) providing a fluid susceptible to formation of clathrate hydrates; and
   (b) contacting said fluid with a polymer additive, wherein said additive has a cyclic chemical grouping, said cyclic chemical grouping having in its chemical structure a heterocyclic organic ring with at least one linkage internal to the ring, said internal linkage selected from the group consisting of an internal amide linkage and an internal ester linkage.

3. The method of claim 2, wherein said fluid is subject to thermodynamic conditions at which clathrate hydrate masses form and are present in said fluid, and wherein the tendency of said clathrate hydrates to agglomerate is reduced by said contacting with said additive.

4. The method of claim 3, wherein said fluid having clathrate hydrate masses present therein flows from a first location to a second location substantially without agglomeration of said clathrate hydrates impeding the flow of said fluid.

5. The method of claim 4, wherein said fluid comprises an extracted fluid selected from the group of extracted oil and extracted natural gas, and wherein said first location is proximate to the place of extraction of said extracted fluid and said second location is proximate to a processing facility for said extracted fluid.

6. The method of claim 2, wherein said internal linkage is an internal amide linkage.

7. The method of claim 2, wherein said cyclic chemical grouping comprises a lactam ring structure.

8. The method of claim 2, wherein said cyclic chemical grouping comprises a pyrrolidone ring structure.

9. The method of claim 2, wherein said cyclic chemical grouping comprises an $\epsilon$-caprolactam ring structure.

10. The method of claim 2, wherein said additive comprises a polymer having a molecular weight of greater than about 20,000.

11. The method of claim 2, wherein said additive comprises a polymer having a molecular weight of greater than about 40,000.

12. The method of claim 2, wherein said additive comprises a poly(N-vinyl lactam) polymer.

13. The method of claim 2, wherein said heterocyclic organic ring is a five member ring.

14. The method of claim 2, wherein said heterocyclic organic ring is a six member ring.

15. The method of claim 2, wherein said heterocyclic organic ring is a seven member ring.

16. The method of claim 2, wherein said additive comprises a first cyclic chemical grouping and a second cyclic chemical grouping, said first cyclic chemical grouping having a first heterocyclic organic ring and said second cyclic chemical grouping having a second heterocyclic organic ring, said first cyclic chemical grouping being chemically different than said second cyclic chemical grouping.

17. The method of claim 16, wherein said first heterocyclic organic ring has a different number of atoms making up said first organic ring than the number of atoms making up said second heterocyclic organic ring.

18. The method of claim 16, wherein said first organic ring comprises at least one constituent atom species that is not a constituent of said second organic ring.

19. The method of claim 16, wherein said first heterocyclic organic ring is a five member ring and said second heterocyclic organic ring is a seven member ring.

20. The method of claim 2, wherein said additive is a polymer having a polyvinyl backbone, and wherein said cyclic chemical grouping is pendent from said backbone.

21. The method of claim 20, wherein said additive has a noncyclic chemical grouping pendent from said backbone, said noncyclic chemical grouping having an amine group.

22. The method of claim 20, wherein said additive has repeating units representative of polymerization of at least N-vinyl-pyrrolidone monomer.

23. The method of claim 22, wherein said additive is poly (N-vinyl-pyrrolidone).

24. The method of claim 20, wherein said additive has repeating units representative of polymerization of at least N-vinyl-$\epsilon$-caprolactam monomer.

25. The method of claim 24, wherein said additive is poly (N-vinyl-$\epsilon$-caprolactam).

26. The method of claim 2, wherein said clathrate hydrates are gas hydrates.

27. A method for controlling clathrate hydrates in a fluid, the method comprising the steps of:
(a) providing a fluid susceptible to formation of clathrate hydrates; and
(b) contacting said fluid with a polymer additive, wherein said additive has in its chemical structure at least one cyclic chemical grouping having a seven member heterocyclic organic ring.

28. The method of claim 27, wherein said seven member organic ring has an amide linkage internal to said ring.

29. The method of claim 27, wherein said seven member organic ring has an ester linkage internal to said ring.

30. The method of claim 27, wherein said cyclic chemical grouping comprises an $\epsilon$-caprolactam ring structure.

31. The method of claim 27, wherein said additive is a polymer having a plurality of said cyclic chemical grouping having a seven member heterocyclic organic ring.

32. The method of claim 27, wherein said additive is a poly (N-vinyl-$\epsilon$-caprolactam).

33. The method of claim 27, wherein said fluid is subject to thermodynamic conditions at which clathrate hydrate masses form and are present in said fluid, and wherein the tendency of said clathrate hydrates to agglomerate is reduced by said contacting with said additive.

34. The method of claim 33, wherein said fluid having clathrate hydrate masses present therein flows from a first location to a second location substantially without agglomeration of said clathrate hydrates impeding the flow of said fluid.

35. A method for controlling clathrate hydrates in a fluid, the method comprising the steps of:
(a) providing a fluid susceptible to formation of clathrate hydrates; and
(b) contacting said fluid with a polymer additive, wherein said additive has in its chemical structure a first cyclic chemical grouping which has a first organic ring and a second cyclic chemical grouping which has a second organic ring, said first organic ring having a different number of atoms making up said first organic ring than the number of atoms making up said second organic ring.

36. The method of claim 35, wherein said first organic ring and said second organic ring are each independently selected from the group consisting of a five member ring, a six member ring, and a seven member ring.

37. The method of claim 35, wherein said first organic ring is a heterocyclic ring.

38. The method of claim 37, wherein said second organic ring is a heterocyclic ring.

39. The method of claim 35, wherein said first cyclic chemical grouping comprises a lactam ring structure.

40. The method of claim 39, wherein said second cyclic chemical grouping comprises a lactam ring structure.

41. The method of claim 35, wherein said first cyclic chemical grouping comprises a pyrrolidone ring structure.

42. The method of claim 35, wherein said second cyclic chemical grouping comprises an ε-caprolactam ring structure.

43. The method of claim 35, wherein said additive is a poly(N-vinyl lactam).

44. The method of claim 35, wherein said additive is a polymer having repeating units representative of copolymerization of at least N-vinyl pyrrolidone, N-vinyl-ε-caprolactam, and dimethyl ethyl amino methacrylate.

45. The method of claim 35, wherein said fluid is subjected to thermodynamic conditions at which clathrate hydrate masses form and are present in said fluid, and wherein the tendency of said clathrate hydrates to agglomerate is reduced by said contacting with said additive.

46. The method of claim 45, wherein said fluid having clathrate hydrate masses present therein flows from a first location to a second location substantially without agglomeration of said clathrate hydrates impeding the flow of said fluid.

47. A method for controlling clathrate hydrates in a fluid, the method comprising the steps of:
  (a) providing a fluid susceptible to formation of clathrate hydrates; and
  (b) contacting said fluid with an additive, said additive being a polymer having a backbone chain and having a first chemical grouping being a cyclic chemical grouping and a second chemical grouping being noncyclic and having an amine group, said first chemical grouping and said second chemical grouping being pendent from said backbone chain.

48. The method of claim 47, wherein said backbone chain is a polyvinyl backbone.

49. The method of claim 47, wherein said second chemical grouping has the chemical formula

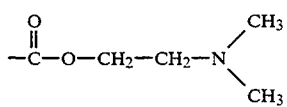

50. The method of claim 47, wherein said first chemical grouping comprises a lactam ring structure.

51. The method of claim 50, wherein said lactam ring structure is an ε-caprolactam ring structure, having the chemical formula

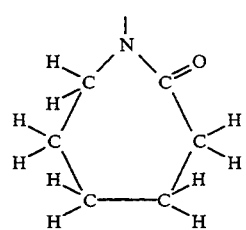

52. The method of claim 50, wherein said lactam ring structure is a pyrrolidone ring structure, of the chemical formula

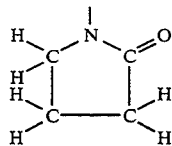

53. A method for preventing clathrate hydrates from impeding the flow of a fluid, the method comprising the steps of:
  (a) first providing a flowable fluid, the flow of which is susceptible to being impeded by formation and agglomeration in said fluid of clathrate hydrate masses;
  (b) second providing an additive, said additive being a polymer having a molecular weight of greater than about 20,000 comprising a plurality of cyclic chemical groupings;
  (c) subjecting said fluid to thermodynamic conditions at which clathrate hydrate masses form and are present in said fluid, said clathrate hydrate masses being susceptible to agglomeration;
  (d) contacting said flowable fluid having said clathrate hydrate masses present therein with said additive under conditions at which said clathrate hydrate masses are thermodynamically stable; and
  (e) flowing said fluid in contact with said additive and having said clathrate hydrate masses therein, said clathrate hydrate masses being substantially prevented from impeding the flow of said fluid due to agglomeration of said clathrate hydrate masses.

54. The process of claim 53, wherein said polymer has a molecular weight of greater than about 40,000.

55. The process of claim 53, wherein said polymer has a polyvinyl backbone and wherein said cyclic chemical groupings are pendent from said polymer.

56. The process of claim 53, wherein said cyclic chemical grouping comprises a lactam ring structure.

57. The process of claim 53, wherein said additive comprises a poly(N-vinyl lactam).

58. A method for preventing problems that could occur from the presence of clathrate hydrates in a fluid, the method comprising the steps of:
  (a) providing a fluid susceptible to clathrate hydrate formation; and
  (b) contacting said fluid with a polymer, said polymer being a poly(N-vinyl lactam).

59. The method of claim 58, wherein said poly(N-vinyl lactam) is a copolymer.

60. The method of claim 58, wherein said polymer has a polyvinyl backbone having pendent therefrom a first chemical grouping, a second chemical grouping, and a third chemical grouping, said first chemical grouping having a pyrrolidone ring structure of the chemical formula

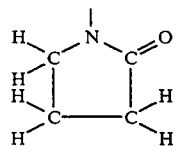

said second chemical grouping having an ε-caprolactam ring structure of the chemical formula

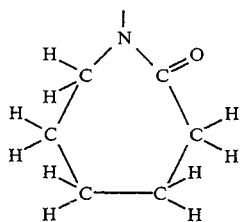

and said third chemical grouping having the chemical formula

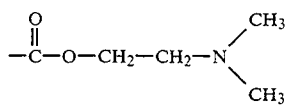

61. A method for preventing the inhibition of flow of a fluid that may be caused by clathrate hydrates, the method comprising the steps of:
  (a) providing a flowable fluid, the flow of which is susceptible to being impeded by clathrate hydrates;
  (b) providing a polymer additive, said additive having a cyclic chemical grouping having in its chemical structure at least one heterocyclic organic ring, said heterocyclic organic ring having at least one linkage internal to the ring, said linkage selected from the group consisting of an ester linkage and an amide linkage; and
  (c) contacting said flowable fluid with said additive and flowing said flowable fluid in contact with said additive;
whereby flow of said fluid is substantially not impeded by clathrate hydrates.

62. The method of claim 61, wherein said polymer additive comprises repeating units representative of copolymerization of at least N-vinyl-pyrrolidone, N-vinyl-ε-caprolactam, and dimethyl ethyl amino methacrylate.

* * * * *